United States Patent
Pottier et al.

(10) Patent No.: US 11,983,284 B2
(45) Date of Patent: May 14, 2024

(54) CONSENT MANAGEMENT METHODS

(71) Applicant: Arm Cloud Technology, Inc., San Jose, CA (US)

(72) Inventors: Remy Pottier, Grenoble (FR); Michael Lambertus Hubertus Brouwer, Los Gatos, CA (US); Minsheng Lu, Cambridge (GB)

(73) Assignee: Arm Cloud Technology, Inc., San Jose, CA (US)

( * ) Notice: Subject to any disclaimer, the term of this patent is extended or adjusted under 35 U.S.C. 154(b) by 454 days.

(21) Appl. No.: 17/151,778

(22) Filed: Jan. 19, 2021

(65) Prior Publication Data
US 2022/0229918 A1    Jul. 21, 2022

(51) Int. Cl.
| | | |
|---|---|---|
| G06F 21/00 | (2013.01) | |
| G06F 21/60 | (2013.01) | |
| G06F 21/62 | (2013.01) | |
| H04L 9/08 | (2006.01) | |
| H04L 9/32 | (2006.01) | |

(52) U.S. Cl.
CPC ............ *G06F 21/62* (2013.01); *G06F 21/602* (2013.01); *H04L 9/0891* (2013.01); *H04L 9/3236* (2013.01); *G06F 2221/2115* (2013.01); *G06F 2221/2149* (2013.01)

(58) Field of Classification Search
CPC .................. G06F 21/62; G06F 21/602; G06F 2221/2115; G06F 2221/2149; G06F 2221/2107; G06F 21/6245; H04L 9/0891; H04L 9/3236; H04L 9/50
See application file for complete search history.

(56) References Cited

U.S. PATENT DOCUMENTS

| | | | |
|---|---|---|---|
| 8,275,632 B2* | 9/2012 | Awaraji | G06Q 50/265 |
| | | | 705/2 |
| 8,458,491 B1* | 6/2013 | Powell | G06F 21/60 |
| | | | 713/190 |
| 10,320,569 B1* | 6/2019 | Wentz | H04L 9/3239 |
| 2006/0069965 A1* | 3/2006 | Ito | H04N 21/631 |
| | | | 714/100 |
| 2007/0266062 A1* | 11/2007 | Young | G06F 16/113 |
| 2017/0213212 A1* | 7/2017 | Dicker | G06Q 20/3821 |
| 2017/0300713 A1* | 10/2017 | Fan | H04L 63/0435 |
| 2017/0359338 A1* | 12/2017 | Tschofenig | G06F 21/44 |
| 2018/0101734 A1* | 4/2018 | Lemberger | H04N 21/4223 |
| 2018/0183601 A1* | 6/2018 | Campagna | G06F 21/602 |
| 2018/0183807 A1* | 6/2018 | Hwang | G06F 21/552 |
| 2018/0294977 A1* | 10/2018 | Uhr | G06F 21/33 |

(Continued)

FOREIGN PATENT DOCUMENTS

WO    WO-2019107405 A1 *  6/2019  ........... A61B 5/0022

*Primary Examiner* — John B King
(74) *Attorney, Agent, or Firm* — Perkins Coie LLP

(57) ABSTRACT

The present disclosure relates to a computer-implemented method for controlling access to user data of a user. The method comprises: receiving, by a data controller, an access request requesting access to the user data; determining, by the data controller, a consent status and one or more item of information associated with the user data; encrypting, by the data controller, the user data in an encrypted data package encrypted based on the consent status and one or more item of information; and sending, by the data controller, the encrypted data package in response to the access request.

31 Claims, 5 Drawing Sheets

(56) References Cited

U.S. PATENT DOCUMENTS

| | | | | |
|---|---|---|---|---|
| 2018/0349617 | A1* | 12/2018 | Wang | H04L 9/3239 |
| 2019/0081800 | A1* | 3/2019 | Uhr | H04L 9/32 |
| 2019/0124146 | A1* | 4/2019 | Austin | G06Q 20/223 |
| 2019/0188312 | A1* | 6/2019 | Pandit | G06F 21/6245 |
| 2019/0197562 | A1* | 6/2019 | Woerner | H04L 9/3228 |
| 2019/0279172 | A1* | 9/2019 | Duffield | H04L 9/3247 |
| 2019/0286102 | A1* | 9/2019 | Carbone | B33Y 50/02 |
| 2019/0312734 | A1* | 10/2019 | Wentz | H04L 9/0877 |
| 2019/0327239 | A1* | 10/2019 | Ferguson | H04L 63/102 |
| 2020/0136799 | A1* | 4/2020 | Smith | H04L 63/00 |
| 2020/0244700 | A1* | 7/2020 | Moon | G06F 40/35 |
| 2020/0274861 | A1* | 8/2020 | Black | G06N 5/046 |
| 2020/0313852 | A1* | 10/2020 | Cao | H04L 9/3218 |
| 2020/0344062 | A1* | 10/2020 | Haldar | G06F 21/604 |
| 2021/0075782 | A1* | 3/2021 | Dunjic | H04L 63/102 |
| 2021/0209483 | A1* | 7/2021 | Bose | H04L 67/104 |
| 2021/0258375 | A1* | 8/2021 | Cai | H04L 63/123 |
| 2022/0069983 | A1* | 3/2022 | Yoshida | H04L 9/12 |
| 2022/0108037 | A1* | 4/2022 | Benisty | G06F 11/1068 |
| 2022/0200973 | A1* | 6/2022 | Tola | H04L 63/0428 |
| 2023/0085773 | A1* | 3/2023 | Mateos Sole | H04L 9/50 |
| | | | | 713/155 |
| 2023/0209340 | A1* | 6/2023 | Kang | H04W 12/43 |
| | | | | 455/410 |

* cited by examiner

CONSENT MANAGEMENT METHODS

FIELD OF THE INVENTION

The present disclosure relates generally to the field of implementation of consent and security preferences of users, and in particular to methods and devices for controlling access to user data by a third-party device.

BACKGROUND

Data protection and data security legislations aim to protect individuals against misuse of personal information by organizations, businesses or the government. In general, these legislations are implemented through a consent management system that stores user consent information with respect to their personal information, and keeps a log of the location of the information, with whom the information has been shared and how the information has been used.

There are many contexts in which consent and security preferences from one or more parties is required before a third-part device is authorized to access or use private data (e.g. personal data of an individual, data collected on an individual based on online activity or from wearable devices). In some cases, consent may be required from multiple parties. For example, to gain access to an individual's personal data stored in a second-party database, a third-party requester may require consent from the database operator to access the database as well as consent from the individual to access their data.

Many companies and service providers have developed consent management systems to address their specific needs. Some companies and service providers collect information from individuals regarding their preferences for how their data may be used. For example, some companies allow customers to opt-in or opt-out with respect to using their personal information for marketing communications. However, these systems are often tailored to the specific environment required by the companies and service providers that developed them, and generally only make very coarse distinctions concerning access to or use of data by third parties. As a result, such systems are computationally expensive and time-consuming to implement, and may not provide individuals with sufficient security for their private data or the protection afforded to them by data protection legislations.

When a user specifies their consent and security preferences to grant consent and authorization to a service provider to collect and use the data collected from the user, the data is sometimes shared with third parties. For example, the user may check a number of boxes on a consent form on a health tracking application on their device (e.g. a smartphone or a tablet computer) to allow their health data to be collected by the application, and health providers may wish to access and use the collected health data for e.g. marketing communications or providing preventative measures. However, there may be times when the user wishes to revoke previously granted authorization partially or completely, for example when their personal information and/or the collected data has changed, or when the user only intended to grant temporary consent. Moreover, the user may wish to restrict their authorization to specific third parties, to specific types or groups of data, or to specific uses of the data. For example, the user may only wish to authorize temporary sharing of their location information with an electronic map application or restaurant recommendation application, or they may only wish to share their purchase history with online stores but not healthcare providers.

In conventional consent management systems, if a user wishes to revoke their consent, whether partially or entirely, for their data to be accessed by third parties, the user would be required to manually update their security preferences with the service provider (who collects the user's data). The updated security preferences are then passed on to the service provider's consent management system, which subsequently informs third parties who have been accessing and using the user's data to cease using and erase the user's data. This chain of events take time (including the time it takes for the user to eventually update their security preferences) while the user's data continues to be shared with and used by third parties, and this approach relies on the compliance of third parties to erase the user's data. Moreover, consent management provided by conventional consent management systems generally does not allow fine-scale distinction amongst different groups of third-party data requesters or amongst different types of data collected from users.

In view of the foregoing, it is desirable to provide improved methods and systems for controlling access to user data by a third-party device.

BRIEF DESCRIPTION OF THE DRAWINGS

Embodiments will now be described, with reference to the accompanying drawings, in which.

DETAILED DESCRIPTION

Figure 1:
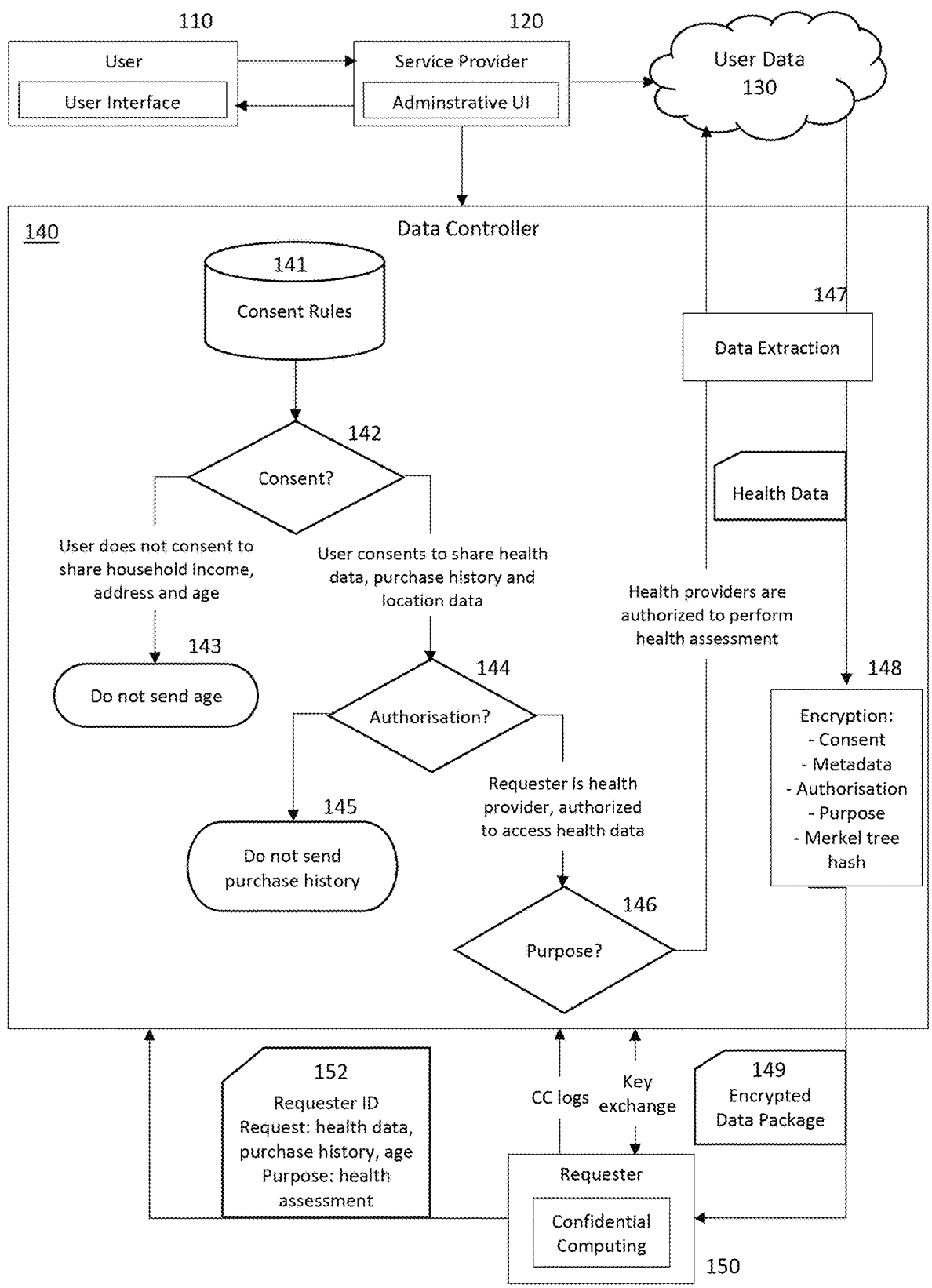
FIG. 1 shows a schematic representation of an exemplary consent management system.

The present disclosure relates to methods and associated system for managing consent and security preferences applicable to a variety of consent environments. The disclosed techniques allow end users to specify consent information associated with their personal data that is relevant to the consent environment, such as who can request the data and for what purpose. Then, when third parties submit access requests to access user data, consent can be efficiently managed in real time using the consent information defined by the end user. It is therefore possible to implement consent on a much finer scale depending on the context of the access request in accordance with the end user's consent information. The disclosed techniques therefore enable first party data asset owners, i.e. the end users, to enforce specific and granular data protection policies regarding legitimate use on third-party data processing systems and entities.

An aspect of the techniques disclosed herein provides a computer-implemented method for controlling access to user data of a user, comprising: receiving, by a data controller, an access request requesting access to the user data; determining, by the data controller, a consent status and one or more item of information associated with the user data; encrypting, by the data controller, the user data in an encrypted data package encrypted based on the consent status and one or more item of information; and sending, by the data controller, the encrypted data package in response to the access request.

According to the present approach, upon receiving an access request from a third party device to access the data of a given user, the data controller process the access request by checking the consent status of the requested data to determine if the requested data is authorised for sharing by the user. Moreover, the data controller determines one or more item of information that is associated with the requested data. The data controller then encrypts the requested data in an encrypted data package that is encrypted based on the consent status and one or more item of information associated with the requested data, and sends the encrypted data package to the requesting third party device. In doing so, user data is sent to third-party device in a secure manner through encryption. Moreover, since the encryption is based on the consent status of the requested data and one or more item of information that is associated with the requested data, the encryption is specific to the requested data and can only be accessed by the intended recipient. It is therefore possible to actively enforce the user's authorisation for their data to only be accessed by the authorised third party.

In some embodiments, the consent status may indicate whether the user consents to the user data being accessed by a third party. The consent status may be implemented in any suitable and desirable manner. For example, the consent status may be implemented as a simple "1" to indicate consent and "0" to indicate no consent. In particular embodiments, upon the data controller determining that the consent status indicates the user does not consent to the user data being accessed by a third party, the data controller may abort the sending of the encrypted data package.

In some embodiments, the one or more item of information may comprise metadata of the content of the user data. In particular embodiments, the metadata of the content of the user data may comprise an indicator that indicates whether the content of the user data has changed since receipt of a previous access request. The metadata may comprise other information regarding the content of the user data, e.g. a data category that specifies the type of data. In further embodiments, upon the data controller determining that the indicator indicates that the content of the user data has changed, the data controller may abort the sending of the encrypted data package. This way, it is possible to anticipate a user potentially revoking their consent to share new or changed data and prevent user data being shared without the user's explicit consent.

In some embodiments, the one or more item of information may comprise purpose information associated with the user data. In particular embodiments, the purpose information may identify one or more operations permitted to be performed on the user data defined by the user. In these embodiments, the encryption of the encrypted data package is performed based on the identified one or more permitted operations; as such, the encryption may be operation-specific. In further embodiments, the access request received from the requesting third party may comprise an indication of an operation to be performed on the user data by the requesting third party, and upon the data controller determining that the indication disagrees with the purpose information associated with the user data, the data controller may abort the sending of the encrypted data package. It is therefore possible to prevent unauthorised uses of user data.

In some embodiments, the one or more item of information may comprise authorisation information associated with the user data. In particular embodiments, the authorisation information may identify one or more third parties permitted to access the user data defined by the user. In these embodiments, the encryption of the encrypted data package is performed based on the identified one or more permitted third parties; as such, the encryption may be requester-specific. In further embodiments, the access request received from the requesting third party may comprise an identifier for a requester, and upon the data controller determining that the identifier disagrees with the authorisation information associated with the user data, the data controller may abort the sending of the encrypted data package. It is therefore possible to prevent unauthorised entities from accessing the user data. In yet further embodiments, the one or more item of information may further comprise user-defined purpose information associated with the user data, which identifies one or more operations permitted to be performed on the user data, and the identified one or more operations may be specific to the identified one or more third parties. This enables a user to specify how their data may be used specific to a particular requesting third party or group of third parties, and the specificity may be implemented through the encryption of the encrypted data package.

In some embodiments, the consent status and the one or more item of information each represents a branch of a Merkel tree, and the user data may be encrypted in the encrypted data package based on a hash of the Merkel tree. In an embodiment, in addition to one or more items of information each representing a branch of a Merkel tree, a hash of the user data may also be used as a branch of the Merkel tree. In further embodiments, the data controller may generate a hash of the Merkel tree using the consent status and the one or more item of information associated with the user data before sending the encrypted data package, and upon determining that the generated hash disagrees with a stored hash of the Merkel tree used for encrypting the user data, the data controller may abort the sending of the encrypted data package. By checking the generated hash against the stored hash used for encrypting the user data, it is possible to perform a real-time consent check to prevent unauthorised access to the user data based on any changes in the consent status and/or the one or more item of information associated with the user data.

In some embodiments, the encrypting the user data may comprise encrypting the data package such that the data package is only accessible in a confidential computing environment. This further protect the user data against unauthorised access or use. In particular embodiments, the data controller may receive a log associated with an operation performed on the user data in the confidential computing environment, and the data controller may verify, based on the received log, that the operation complies with a set of security preferences defined by the user.

In some embodiments, the user data may be encrypted using an encryption key, and, upon a change in the consent status and/or the one or more item of information, the data controller may generate a new encryption key. In doing so, the encryption of the encrypted data package may be kept up to date with changes in user consent and information associated with the user data. In particular embodiments, the data controller may receive a key update request from a third party for the new encryption key, the key update request may comprise an indication of an operation to be performed on the user data. The data controller may determine that the indication agrees with the purpose information associated with the user data, and send new encryption key to the requesting third party. This then allows the data controller to verify whether the requesting third party's intended use of the user data complies with current user security preferences. In further embodiments, upon receiving a key update request for the new encryption key, where the key update request comprises an identifier for a requester, the data controller may determine that the identifier agrees with the authorisation information associated with the user data, and send the new encryption key to the requester. This then allows the data controller to verify whether the requester is still authorised to access the user data in accordance with current user security preferences.

Another aspect of the disclosed techniques provides a computer-implemented method for accessing user data of a user, comprising: sending, by a requester, a first access request to request access to the user data, the first access request comprises one or more item of information associated with the user data; receiving, by the requester, a first encrypted data package; and decrypting, by the requester, said first encrypted data package using the one or more item of information associated with the user data.

In some embodiments, the requester may perform an operation on the decrypted user data in a confidential computing environment, and generate a log associated with the operation including a result of the operation. The requester may then send the log to the data controller for verification that the operation complies with a set of security preferences defined by the user. By implementing a requirement to supply a log of operations performed on the user data, it is possible to incentivise the requester to comply with user security preferences.

In some embodiments, the decrypting the first encrypted data package further comprises using a stored encryption key. The requester may obtain the encryption key in any suitable and desirable manner, but in some embodiments, the encryption key may be requested from a data controller that controls access to the user data e.g. through a verification process, and then stored by the requester for later use. In particular embodiments, upon failing to decrypt the first encrypted data package using the stored encryption key, the requester may send an update request to request new encryption key. Upon receiving the new encryption key, the requester may update the stored encryption key to the new encryption information. In further embodiments, the requester may send a second access request to access the user data. Upon receiving a second encrypted data package encrypted using the new decryption key, the requester may decrypt the second encrypted data package using the stored updated encryption key.

A further aspect of the disclosed techniques provides a data processing device comprising: processing circuitry; communication circuitry; and non-transitory computer-readable memory having stored thereon software instructions that, when executed by the processing circuitry, cause the data processing device to: receive an access request requesting access to the user data; determine a consent status and one or more item of information associated with the user data; encrypt the user data in an encrypted data package using encryption information based on the consent status and one or more item of information; and send the encrypted data package in response to the access request.

A yet further aspect of the disclosed techniques provides a data processing device comprising: processing circuitry; communication circuitry; and non-transitory computer-readable memory having stored thereon software instructions that, when executed by the processing circuitry, cause the data processing device to: send an access request to request access to the user data; receive an encrypted data package encrypted using encryption information based on a consent status and one or more item of information associated with the user data; and decrypting said encrypted data package using stored encryption information associated with the user data.

The present invention relates to a consent and security preferences management system and methods of implementing the consent and security preferences management system. The present approach is capable of implementing real-time consent check and is context-aware in that access control to user data may be implemented based on information associated with the user data such as metadata description of the content of the user data, who is authorised to access the user data, and what can the user data be used for, amongst other things. In this way, it is possible to implement user security preferences in a granular manner and reduce the likelihood of unauthorised access and use by unauthorised entities. Moreover, according to the present approach, the requested user data is encrypted using the consent status of the user data and one or more item of information associated with the requested user data in an encrypted data package before being sent to the requesting third party. In this way, the encryption is specific for the requested user data and is consent-based and context-aware, which can only be accessed by the intended and authorised recipient, thus further reducing the likelihood of unauthorised access and use of the user data.

As will be understood from the description below, the present disclosure includes a consent management system ("data controller") that can be accessed by a service provider ("application") who owns or has control over access to private data ("user data") of a consenter ("user") having the right to grant, withhold or revoke consent, and by a third party ("requester") seeking access to the private data.

It will be appreciated that access to user data may be based on rules and preferences defined by both the user and another party such as the service provider. Moreover, rules may be based on laws, regulations or other security considerations. For example, access to user data by a third-party device may require that the user has consented to the user data being access, that all relevant laws and regulation have been satisfied, and that other organizational security rules and open-ended security concerns have been addressed. Thus, the consent management system may apply these rules originating from a user, legal considerations, and another party. In such cases, multiple parties (e.g., the user and an organization having security policies) may define rules to control access to the requested data. The consent management system may be implemented on a cloud-based platform or on one or more servers or other machines at a single location ("centralised") or multiple locations ("distributed"). The system may also include software or other logic resident on a computer, tablet, phone or other device of e.g., a user or a requester.

A user may enter their security preferences with the service provider using a user interface (e.g. an app). The service provider may access the consent management system to enter user security preferences using e.g. an administrative user interface.

FIG. 1 shows a consent management system according to an embodiment of the present disclosure. The consent management system comprises a data controller 140 accessible by service provider 120, for example via an administrative user interface, to enter user security preferences, e.g. privacy preference settings, for users of its service. The data controller may be cloud-based and may be distributed over multiple devices at multiple locations, or it may be a single centralised server on a single device. The service provider 120 provides a service to a plurality of users through one or more user devices such as smartphones, tablet computers and wearable devices, and collects a variety of personal information of the users ("user data"). The collected user data may be stored locally at the service provider 120 in a database, stored in a database of the consent management system, or, in the present embodiment, the user data can be stored remotely on cloud-based storage 130. A user of the service can access the service of the service provider 120 via a user interface on their user device 110, and can input privacy preferences, including consent or authorisation for who can access the user data that the service provider 120 has collected and for what purpose. A requesting device 150 can access the data controller 140 to enter a request to access the user data collected from user devices by the service provider 120 for a specific purpose.

In the present embodiment, the requester 150 enters a request 152 to the data controller 140. The request 152 may be entered in free-form text or via one or more predefined user interface screens. The request 152 includes one or more item of information associated with the requested data. In the present embodiment, the requesting process requires a requester to include items of information that identify themselves, and specify what data is desired and the purpose of the request. In other embodiments, the requesting process may require more or fewer items of information from the requester. The identity of the requester may be explicitly entered (e.g. by inputting a company name) or it may be entered through a login process. The requested data and the purpose for requesting the data may be entered in free-form text or through selection of one or more items from pre-defined lists. In the present example, the requester 150 is a healthcare provider and requests health data, purchase history and age for health assessment. The request 152 may be specifically directed towards the user 110 (e.g. the requester 152 may be private medical practice and the user 110 is a patient at the practice), or directed generally to a group of users.

The data controller 140 comprises a repository of consent rules 141, which may include rules encoding current rules and regulations regarding data privacy and organizational policies that apply generally to all users, and user privacy preferences that are specific to each user. FIG. 1 illustrates an example execution of such rules for the user 110 based on the request 152.

In the example, the data controller 140 receives the request 152 from the requester 150 and processes the request 152 in accordance with the rules in the repository 141. The data controller 140 determines whether the user 110 consents 142 to the requested data being accessed and used by third parties. In this case, the user 110 does not consent to age information being accessed 143 but consents to health data and purchase history data being accessed. The data controller 140 further determines whether the requester 150 is authorised to access the requested data 144. In this case, the requester 150 is identified as a healthcare provider, and the data controller 140 determines that the requester 150 is not authorised to access the user's purchase history 145 but authorised to access the user's health data. The data controller 140 further determines whether the requester's specified purpose for accessing the requested data 146 is authorised. In this case, the data controller 140 determines that the requester 150 is authorised to perform health assessment using the requested data. It should be noted that the determinations described here may be performed by the data controller 140 as separate processing steps in different orders, or simultaneously in parallel. Further, it is not essential for the data controller to perform all the determinations described here and there may be situations in which one or more steps can be omitted, for example, if a requester is identified as a law-enforcement agency.

Based on the result of the determinations, the data controller 140 extracts 147 the authorised data, in this case health data, from the cloud-based storage 130, and proceeds to encrypt the extracted data 148.

The encryption 148 may be performed using any suitable encryption methods. In the present embodiment, an encryption key-based technique is used; however, it should be appreciated that an encryption key in not essential. The encryption key may be provided to the requester 150, for example, upon registering with the data controller 140. The encryption key may be periodically updated by the data controller 140 or in response to any changes in the user data or changes in consent rules, and send to the requester 150 as part of the update or upon request by the requester 150. In the present embodiment, the extracted health data is encrypted in an encrypted data package 149, encrypted using the current encryption key and based on a consent status and one or more item of information associated with the requested data. For example, the consent status of the requested data may be a numerical value such as "1" to indicate consent from the user 110, and the one or more item of information associated with the requested data may be metadata description of the content of the data (e.g. health data), authorisation information that identifies one or more third parties authorised to access the data (e.g. an access control list ACL), and purpose information that identifies one or more permitted operations that can be performed on the data (e.g. tasks). The consent status, content metadata, authorisation information and purpose information may for the branches of a Merkel tree, and a hash of the Merkel tree may be generated for the requested data and used as part of the encryption. The encryption may be implemented such that the encrypted data package 149 can only be accessed in a confidential computing environment. In an example, prior to sending the encrypted data package 149, the data controller may perform a check by generating a Merkel tree hash using real-time consent status, content metadata, authorisation information and purpose information at the time of sending the encrypted data package 149, and compare the generated hash against the Merkel tree hash used for encrypting the encrypted data package 149. If the generated hash disagrees with the hash used as part of the encryption, the data controller 140 aborts the sending of the encrypted data package.

The encrypted data package 149 is sent to the requester 150. Upon receiving the encrypted data package 149, the requester 150 decrypts the encrypted data package 149 in a confidential computing environment using a stored encryption key, and the one or more item of information associated with the requested data included in the request 152, for example in the form of the above Merkel tree hash, to access the requested data. The requester 150 performs a health assessment operation using the requested data in the confidential computing environment, and the operation generates a log that includes details of the operation performed on the requested data and the result of the computation. The log is then sent to the data controller 140, which verifies that the operation performed on the requested data complies with the consent and security rules in its repository 141.

Figure 2:
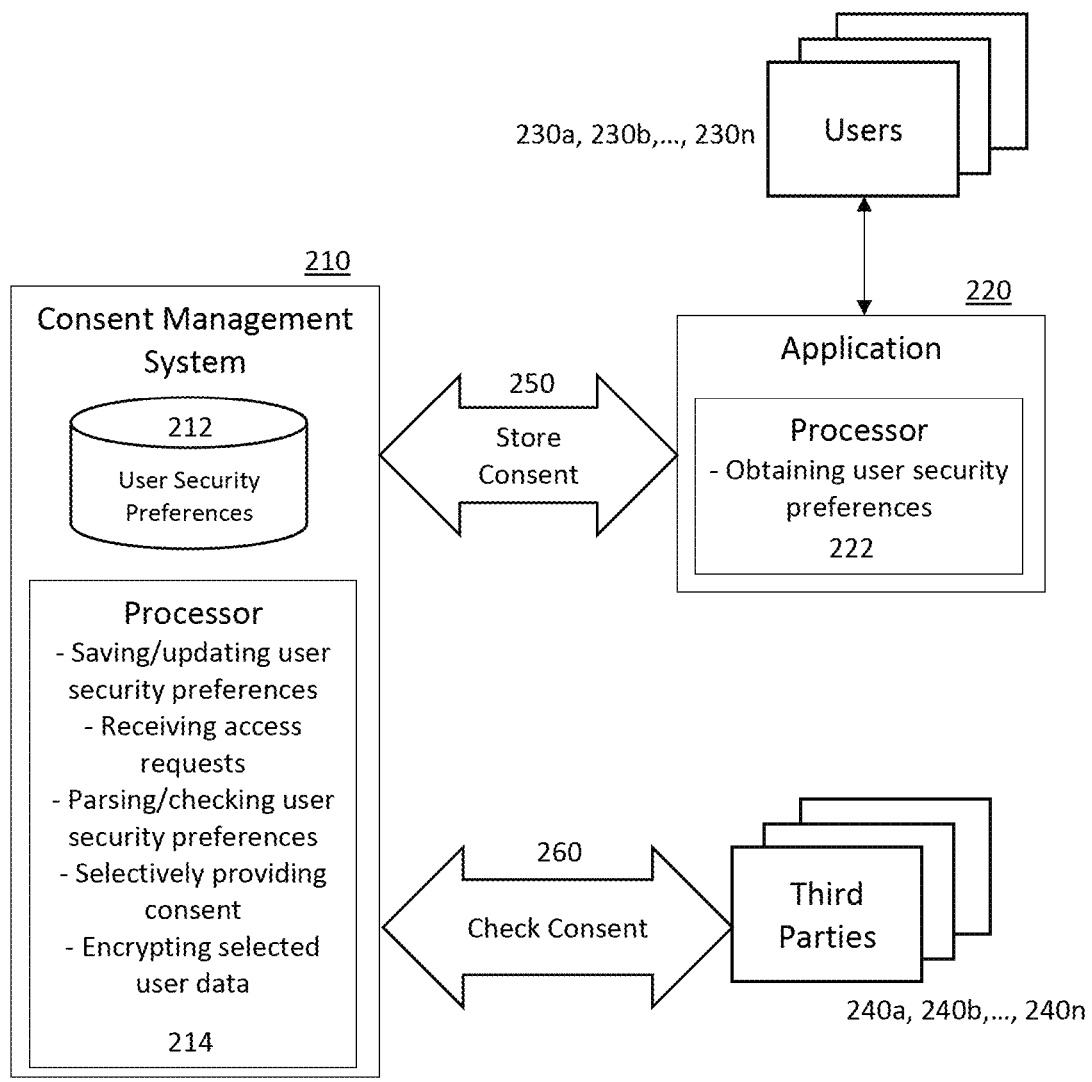
FIG. 2 shows a schematic representation of an exemplary data environment.

FIG. 2 shows an overall data environment according to an embodiment. Generally, the environment includes an application 220 and a Consent Management System (CMS) 210. In the present embodiment, the CMS 210 is a platform running logic (software, hardware and/or firmware) that stores and processes user security preferences 212. The platform may comprise a single machine (e.g. a server) or multiple machines that can be geographically distributed and communicating over a network. The application 220 is a platform running logic (software, hardware, and/or firmware) that uses the CMS 210 to manage preferences of its users 230a, 230b, ..., 230n on certain activities, events, or other situations. Again, the platform may be embodied in a single or multiple machines and may be geographically distributed. The users 230a, 230b, ..., 230n can be any person, people, and/or entities whose consent is sought or required for an activity, event, or other situation. The CMS 210 may be configured to support many different types of applications where consent of users is sought or required. For example, e-commerce applications, health-monitoring applications, lifestyle applications, or any other applications that store and process user data and involves user consent. Although only a single application 220 is depicted in FIG. 2 for purposes of illustration, it will be appreciated that the CMS 210 may support many applications that operate in different consent environments.

Similarly, it will be appreciated that a variety of different parties may seek consent to access personal information of the users. These may be individuals, groups of people, and/or organizations (companies, government agencies or other entities). In the present embodiment, these parties are referenced as third parties 240a, 240b, ..., 240n in FIG. 2. Examples of such third parties include e-commerce platforms, marketers, researchers, medical service providers, government agencies, targeted advertising platforms, social networks, licensing agents, creditors, and others.

As noted above consent of an end user may be sought or required in a variety of different situations. Accordingly, the presently disclosed techniques may be used in relation to any activity, event, or other situation for which consent to access user data is sought or required. For example, consent may be required in the following situations:
- in healthcare, consent to access patient information (e.g., by a healthcare provider or insurance company) to provide care or for research;
- in healthcare, consent to access user's health monitoring data to provide early warning or to provide preventative measures;
- agreement to the terms and conditions of a website;
- agreement to be contacted by an entity by email, e.g. for marketing;
- agreement to receive targeted advertisements via IP and broadcast networks and/or to allow use of personal information in connection therewith;
- agreement to allow creditors, financial organizations, banks, or social networks to verify personal or financial information;
- agreement to be contacted by political candidates or organizations; and
- agreement to have personal information shared with third parties.

It should be noted that the above list of examples is not exhaustive and it will be appreciated that many other situations exists in which user consent may be required. In such cases, consent can be understood as involving a permission, limitation, or denial of permission with respect to specific elements or subsets of elements for which consent is sought or required. This may involve some identification of the user or users and a context. The context describes the situation specific to the request and may include, for example, an identification of data for which access is desired, who is seeking access and for what purpose. In the present example, the third parties 240a, 240b, ..., 240n request access to user data from the CMS 210, which manages such requests, e.g., to analyse and respond to such requests. However, in other embodiments, the third parties 240a, 240b, ..., 240n may request access to user data from the application 220 and the application 220 may invoke the CMS 210 to manage such requests. Accordingly, in the illustrated data environment, structure may be provided by which the application 220 and CMS 210 can exchange data objects, e.g., for saving user consent information 212 and for transmitting, evaluating, and responding to consent requests. Such structure may for example include a Store Consent API 250 used to capture user security preferences and a Check Consent API 260 used to transmit requests and receive request results.

The Store Consent API 250 and Check Consent API 260 may be implemented using generic data and processing objects, as well as sets of operators concerning the relationships and interactions of the objects, that can be defined for a particular application. A fundamental concept in the data environment 300 is context (information associated with and specific to the requested data). Context can be used in defining consents provided by the users 230a, 230b, ..., 230n (e.g., access is granted for specific subject matter, to a specific party, and for a specific purpose) and in conveying access requests (e.g., specific subject matter for which access is requested and specific purpose for requesting the data). It will be appreciated that the third parties 240a, 240b, ..., 240n may access the CMS 210, and the users 230a, 230b, ..., 230n may access the application 220, using various client devices such as computers, tablet computers, mobile devices and the like. The illustrated CMS 210 includes a processor 214 for executing CMS functionality described herein. Similarly, the application platform 220 includes a processor 222 for executing application functionality. Many of the functions described herein can be configured for execution on a client device, the CMS 210 or the application platform 220, or may be distributed across these elements. For example, the client devices of the users 230a, 230b, ..., 230n and the third parties 240a, 240b, ..., 240n may have logic for executing such functionality or such logic may be provided at the CMS 210 and/or application platform 220.

Figure 3:
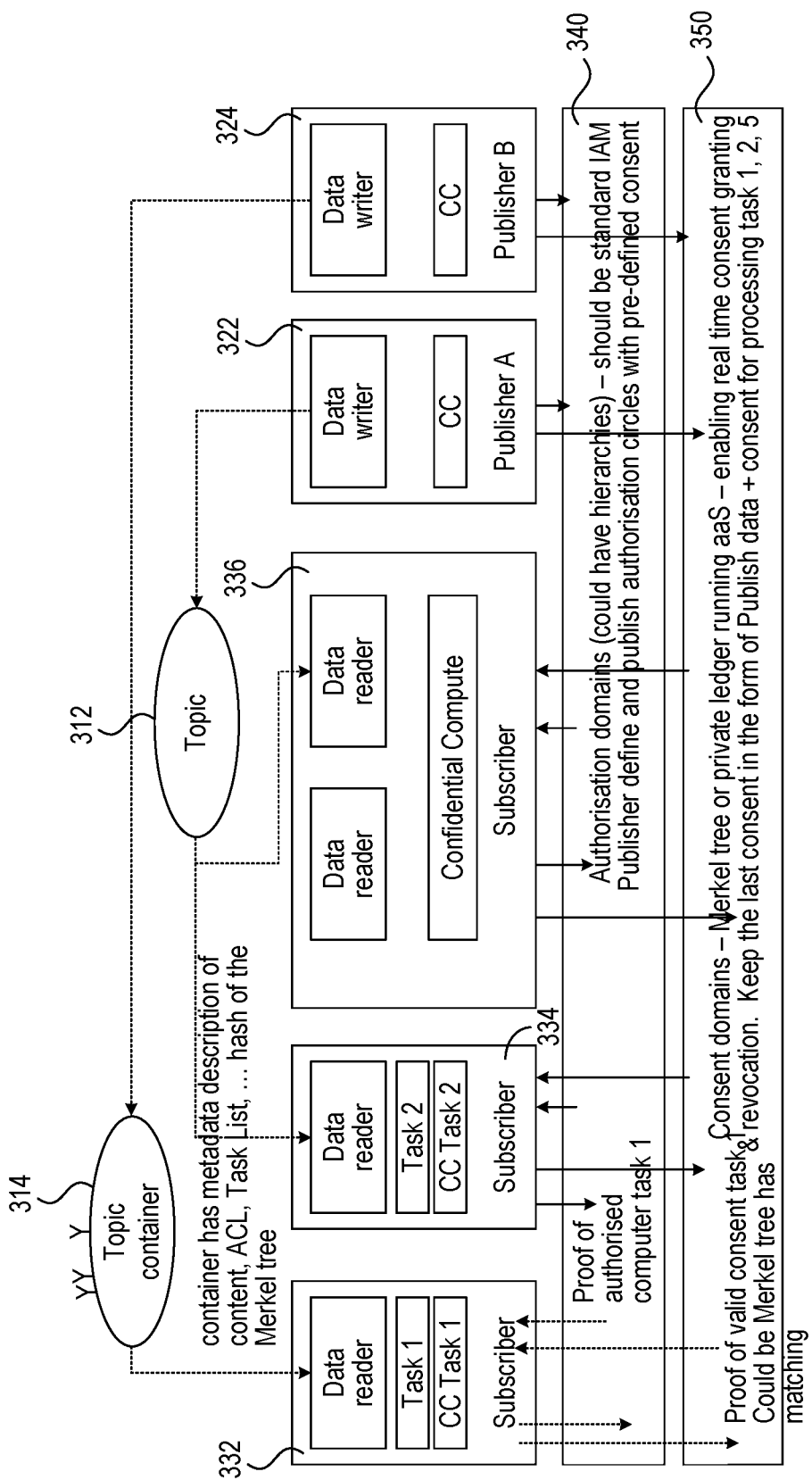
FIG. 3 shows a high-level system view of an exemplary consent management system.

FIG. 3 shows a high-level system view of a consent management system according to another embodiment, implemented in a distributed model. The consent management system (CMS) can be viewed as comprising a consent domain 350 and an authorisation domain 340. The consent domain 350 and the authorisation domain 350 may be distributed over multiple machines. Publishers 322 and 324, e.g. service providers, communicate with the CMS to provide consent and authorisation information. Subscribers 332, 334 and 336, e.g. marketing companies or healthcare providers, communicates with the CMS to request and receive user data.

The consent domain 350 may be implemented using a Merkle tree in which each of a consent status and one or more item of information associated with the user data forms a branch. The one or more item of information associated with the use data may include metadata description of the content of the user data, authorisation information identifying one or more third parties permitted to access the user data, and purpose information identifying one or more operations permitted to be performed on the user data. The consent domain 340 may be implemented as a private ledger running as a service. The consent domain 340 enables real-time consent granting and revocation. The consent domain 340 maintains the most recent consent status of user data in the form of published data, and maintains information on consent for specific processing tasks.

The authorisation domain 340 may be implemented using known identity and access management system and may be implemented with hierarchies. An example of such hierarchies may include, at a first level, a user's personal data domain and professional data domain. At a second level under the domain of personal data, the data may be divided into sub-domains of e.g. health, finance, gaming, etc. At a third level under the sub-domain of health data, the data may be further divided for example into (i) emergency data including e.g. the user's blood group, vaccination data, etc. to be shared with hospitals and medical professionals in case of an emergency; (ii) dental data to be shared with one or more specified dentists; and (iii) other generic health data to be shared with e.g. the user's personal trainer, sports coach, nutritionist, etc. A publisher may define and publish authorisation circles with pre-defined consent. The authorisation circles may include one or more third parties permitted to access and use the user data. The pre-defined consent may be user-defined consent preferences and consent rules defined by the publisher.

A subscriber 332, 334, 336 may request user data from the CMS, identifying itself and specify the specific data requested and the specific purpose for requesting the user data. When the consent domain 350 confirms a valid consent for the requested data and the authorisation domain 340 confirms a proof of authorised computation task specified in the request, the requested data may be sent to the requesting subscriber in an encrypted topic container 312, 314. The topic may include the consent status of the requested user data and one or more item of information associated with the requested user data. In the present example, the container 312, 314 can only be decrypted in a confidential computing environment and only if the information provided by the subscriber 332, 334, 336 agrees with the topic. It is therefore possible to control access to user data to only authorised parties for only authorised tasks, and the user data can only be accessed by the intended recipient.

Figure 4:
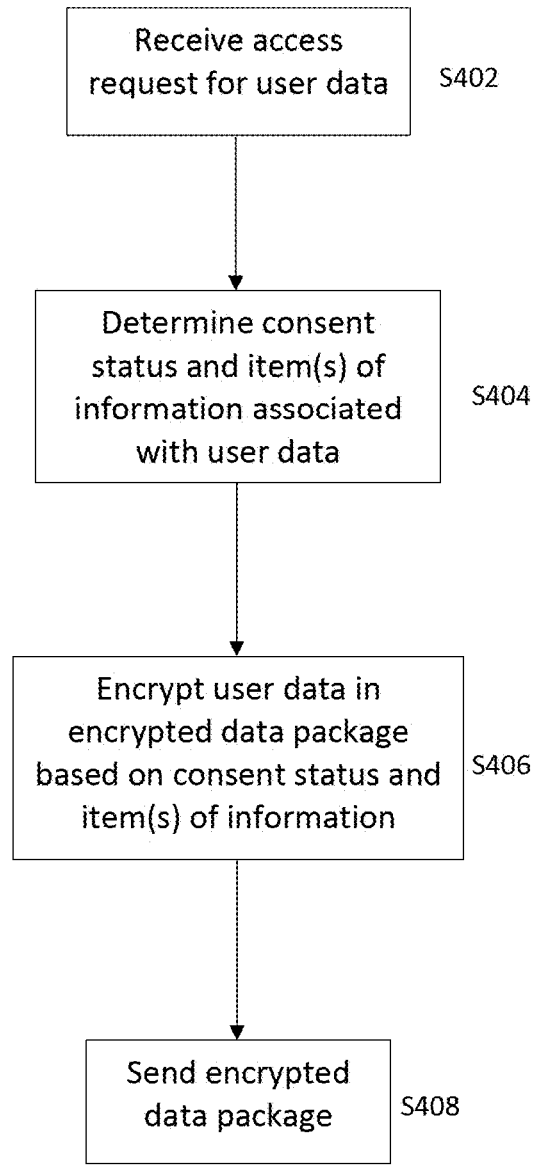
FIG. 4 shows a flow diagram of an exemplary method of controlling access to user data.

FIG. 4 shows a flow diagram of a method of controlling access to user data implemented by a consent management system, e.g. the data controller 140, according to an embodiment. The process beings at block S402 at which the CMS receives an access request from a third party to access user data. The request may for example includes the identity of the requester, the specific data for which access is requested, and the purpose for requesting the specified data.

The CMS then, at block S404, determines the consent status of the requested user data and one or more item of information associated with the requested user data. The consent status may for example indicate whether the user consents to the user data being accessed and used, and the one or more item of information associated with the requested user data may for example include metadata description of the content of the requested user data, authorization information that identifies one or more third parties authorized to access the requested user data, and purpose information that identifies one or more operations permitted to be performed on the requested user data. The consent status and one or more item of information may each form a branch of a Merkel tree and a hash of the Merkel tree may be generated.

At block S406, the CMS encrypts the requested user data in an encrypted data package. The encryption of the encrypted data package uses the consent status and the one or more item of information associated with the requested user data to encrypt the data package. For example, the Merkel tree hash generated using the consent status and the one or more item of information may be used for the encryption.

At block S408, the encrypted data package is sent to the requester in response to the request.

Figure 5:
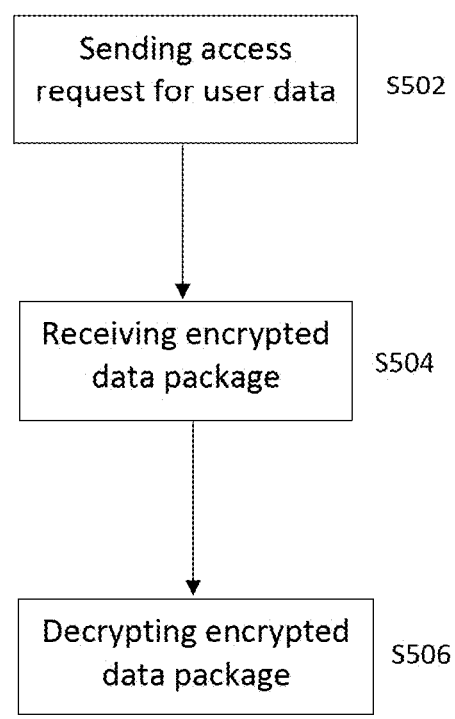
FIG. 5 shows a flow diagram of an exemplary method of accessing user data.

FIG. 5 shows a flow diagram of a method of accessing user data implemented by a requester, e.g. the requester 150. The process begins at block S502 at which the requester sends a request to a consent management system, e.g. the data controller 140, to request access to user data. The access request includes one or more item of information associated with the requested data. The request may for example includes the identity of the requester, the specific data for which access is requested, and the purpose for requesting the specified data.

Next, at block S504, the requester receives an encrypted data package from the CMS comprising the requested data.

Upon receiving the encrypted data package, the requester at block S506 decrypts the encrypted data package using the one or more item of information associated with the requested data included in the access request. For example, the decryption may be performed in a confidential computing environment. The decryption may further require the use of a stored encryption key previously received from the CMS.

Techniques describe herein enable user data to be shared only with the intended recipient, who is authorized to access the requested data for a specific authorized purpose, through the determination of one or more item of information associated with the user data in addition to the consent status of the user data, and encrypting the user data in an encrypted data package based on the consent status and the one or more item of information. As such, techniques described herein enable user consent, organizational consent rules and data protection regulations to be implemented in relation to data sharing and usage in a real-time, context-based and secure manner, thus reducing the risk of unauthorized access and use of user data.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages. For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be clear to one skilled in the art that many improvements and modifications can be made to the foregoing exemplary embodiments without departing from the scope of the present techniques.

The invention claimed is:

1. A computer-implemented method for controlling access to user data of a user, comprising:
   receiving, by a data controller, an access request requesting access to the user data;
   determining, by the data controller, a consent status and one or more item of information associated with the user data;
   encrypting, by the data controller, the user data in an encrypted data package encrypted based on the consent status and the one or more item of information; and
   sending, by the data controller, the encrypted data package in response to the access request;
   wherein said one or more item of information comprises purpose information associated with the user data, and wherein said purpose information identifies one or more operations permitted to be performed on the user data defined by the user;
   wherein the user data is encrypted using an encryption key, the method further comprises, upon a change in said consent status and/or said one or more item of information:
   generating, by the data controller, a new encryption key;
   receiving, by the data controller, a key update request for said new encryption key, said key update request comprising an indication of an operation to be performed on the user data;
   determining, by the data controller, that said indication agrees with said purpose information associated with the user data; and
   sending, by the data controller, said new encryption key.

2. The method of claim 1, further comprising:
   determining, by the data controller, that the indication disagrees with the purpose information associated with the user data; and
   aborting, by the data controller, the sending of the encrypted data package.

3. The method of claim 1, wherein the consent status and the one or more item of information each represents a branch of a Merkle tree, and the user data is encrypted in said encrypted data package based on a hash of the Merkle tree.

4. The method of claim 3, further comprising:
   generating, by the data controller, the hash of the Merkle tree before sending the encrypted data package;
   determining, by the data controller, that the generated hash disagrees with a stored hash of the Merkle tree used for encrypting the user data; and
   aborting, by the data controller, the sending of the encrypted data package.

5. The method of claim 1, wherein the encrypting the user data comprises encrypting a data package such that said data package is only accessible in a confidential computing environment, the method further comprising:
   receiving, by the data controller, a log associated with an operation performed on the user data in said confidential computing environment; and
   verifying, by the data controller based on the received log, that said operation performed in said confidential computing environment complies with a set of security preferences defined by the user.

6. The method of claim 1, wherein said consent status indicates whether the user consents to the user data being accessed by a third party.

7. The method of claim 6, wherein, upon determining, by the data controller, that said consent status indicates the user does not consent to the user data being
   accessed by a third party, aborting the sending of the encrypted data package.

8. The method of claim 1, wherein said one or more item of information comprises metadata of content of the user data.

9. The method of claim 8, wherein said metadata of the content of the user data comprises an indicator that indicates whether the content of the user data has changed since receipt of a previous access request.

10. The method of claim 8, wherein said metadata of the content of the user data comprises an indicator that indicates whether the content of the user data has changed since receipt of a previous access request, and the method further comprises:
    determining, by the data controller, that said indicator indicates that the content of the user data has changed; and
    aborting, by the data controller, the sending of the encrypted data package.

11. A computer-implemented method for controlling access to user data of a user, comprising:
    receiving, by a data controller, an access request requesting access to the user data;
    determining, by the data controller, a consent status and one or more item of information associated with the user data;
    encrypting, by the data controller, the user data in an encrypted data package encrypted based on the consent status and the one or more item of information; and
    sending, by the data controller, the encrypted data package in response to the access request;
    wherein said one or more item of information comprises authorisation information associated with the user data, and wherein said authorisation information identifies one or more third parties permitted to access the user data defined by the user;
    wherein the user data is encrypted using an encryption key, the method further comprises, upon a change in said consent status and/or said one or more item of information:

generating, by the data controller, a new encryption key;
receiving, by the data controller, a key update request for said new encryption key, said key update request comprising an identifier for a requester;
determining, by the data controller, that said identifier agrees with said authorisation information associated with the requested user data; and
sending, by the data controller, said new encryption key.

12. The method of claim 11, wherein said one or more item of information further
comprises purpose information associated with the user data, said purpose information, defined by the user, identifies one or more operations permitted to be performed on the user data, the identified one or more operations being specific to the identified one or more third parties.

13. The method of claim 11, further comprising:
determining, by the data controller, that the identifier disagrees with the authorisation information associated with the user data; and
aborting, by the data controller, the sending of the encrypted data package.

14. The method of claim 11, wherein said consent status indicates whether the user consents to the user data being accessed by a third party.

15. The method of claim 14, wherein, upon determining, by the data controller, that said consent status indicates the user does not consent to the user data being accessed by a third party, aborting the sending of the encrypted data package.

16. The method of claim 11, wherein said one or more item of information comprises metadata of content of the user data.

17. The method of claim 16, wherein said metadata of the content of the user data comprises an indicator that indicates whether the content of the user data has changed since receipt of a previous access request.

18. The method of claim 16, wherein said metadata of the content of the user data comprises an indicator that indicates whether the content of the user data has changed since receipt of a previous access request, and the method further comprises:
determining, by the data controller, that said indicator indicates that the content of the user data has changed; and
aborting, by the data controller, the sending of the encrypted data package.

19. The method of claim 11, wherein the consent status and the one or more item of information each represents a branch of a Merkle tree, and the user data is encrypted in said encrypted data package based on a hash of the Merkle tree.

20. The method of claim 19, further comprising:
generating, by the data controller, the hash of the Merkle tree before sending the encrypted data package;
determining, by the data controller, that the generated hash disagrees with a stored hash of the Merkle tree used for encrypting the user data; and
aborting, by the data controller, the sending of the encrypted data package.

21. The method of claim 11, wherein the encrypting the user data comprises encrypting a data package such that said data package is only accessible in a confidential computing environment, the method further comprising:
receiving, by the data controller, a log associated with an operation performed on the user data in said confidential computing environment; and
verifying, by the data controller based on the received log, that said operation complies with a set of security preferences defined by the user.

22. A computer-implemented method for accessing user data of a user, comprising:
sending, by a requester, a first access request to request access to the user data, the first access request comprising one or more item of information associated with the user data;
receiving, by the requester, a first encrypted data package; and decrypting, by the requester, said first encrypted data package using the one or more item of information associated with the user data;
wherein said one or more item of information comprises purpose information associated with the user data, and wherein said purpose information identifies one or more operations permitted to be performed on the user data defined by the user;
wherein the user data is encrypted using an encryption key, the method further comprises, upon a change in consent status and/or said one or more item of information:
generating a new encryption key;
receiving a key update request for said new encryption key, said key update request comprising an indication of an operation to be performed on the user data;
determining that said indication agrees with said purpose information associated with the user data; and
sending said new encryption key.

23. The method of claim 22, further comprising:
performing, by the requester, an operation on the decrypted user data in a confidential computing environment;
generating, by the requester, a log associated with said operation performed in the confidential computing environment including a result of said operation; and
sending, by the requester, said log for verification that said operation complies with a set of security preferences defined by the user.

24. The method of claim 22, wherein the decrypting said first encrypted data package further comprises using a stored encryption key, the method further comprising, upon failing to decrypt said first encrypted data package using said stored encryption key:
sending, by the requester, an update request to request an updated encryption key;
receiving, by the requester, new encryption information associated with the user data; and
updating, by the requester, said stored encryption key to said updated encryption key.

25. The method of claim 24, further comprising:
sending, by the requester, a second access request to access the user data;
receiving, by the requester, a second encrypted data package encrypted using new decryption information; and
decrypting, by the requester, said second encrypted data package using the stored updated encryption key.

26. A data processing device comprising: processing circuitry; communication circuitry; and non-transitory computer-readable memory having stored thereon software instructions that, when executed by the processing circuitry, cause the data processing device to:
receive an access request requesting access to user data;
determine a consent status and one or more item of information associated with the user data;

encrypt the user data in an encrypted data package using encryption information based on the consent status and the one or more item of information; and send the encrypted data package in response to the access request;

wherein said one or more item of information comprises purpose information associated with the user data, and wherein said purpose information identifies one or more operations permitted to be performed on the user data defined by the user;

wherein the user data is encrypted using an encryption key, and wherein upon a change in said consent status and/or said one or more item of information:

generating a new encryption key;

receiving a key update request for said new encryption key, said key update request comprising an indication of an operation to be performed on the user data;

determining that said indication agrees with said purpose information associated with the user data; and sending said new encryption key.

27. A computer-implemented method for accessing user data of a user, comprising:

sending, by a requester, a first access request to request access to the user data, the first access request comprising one or more item of information associated with the user data;

receiving, by the requester, a first encrypted data package; and decrypting, by the requester, said first encrypted data package using the one or more item of information associated with the user data;

wherein said one or more item of information comprises authorisation information associated with the user data, and wherein said authorisation information identifies one or more third parties permitted to access the user data defined by the user;

wherein the user data is encrypted using an encryption key, the method further comprises, upon a change in consent status and/or said one or more item of information:

generating a new encryption key;

receiving a key update request for said new encryption key, said key update request comprising an identifier for a requester;

determining that said identifier agrees with said authorisation information associated with the requested user data; and sending said new encryption key.

28. The method of claim 27, further comprising:

performing, by the requester, an operation on the decrypted user data in a confidential computing environment;

generating, by the requester, a log associated with said operation performed in the confidential computing environment including a result of said operation; and sending, by the requester, said log for verification that said operation complies with a set of security preferences defined by the user.

29. The method of claim 27, wherein the decrypting said first encrypted data package further comprises using a stored encryption key, the method further comprising, upon failing to decrypt said first encrypted data package using said stored encryption key:

sending, by the requester, an update request to request an updated encryption key;

receiving, by the requester, new encryption information associated with the user data; and updating, by the requester, said stored encryption key to said an updated encryption key.

30. The method of claim 29, further comprising:

sending, by the requester, a second access request to access the user data;

receiving, by the requester, a second encrypted data package encrypted using new decryption information; and decrypting, by the requester, said second encrypted data package using the stored updated encryption key.

31. A data processing device comprising: processing circuitry; communication circuitry; and non-transitory computer-readable memory having stored thereon software instructions that, when executed by the processing circuitry, cause the data processing device to:

receive an access request requesting access to user data;

determine a consent status and one or more item of information associated with the user data;

encrypt the user data in an encrypted data package using encryption information based on the consent status and the one or more item of information; and send the encrypted data package in response to the access request;

wherein said one or more item of information comprises authorisation information associated with the user data, and wherein said authorisation information identifies one or more third parties permitted to access the user data defined by the user;

wherein the user data is encrypted using an encryption key, and wherein upon a change in said consent status and/or said one or more item of information:

generating a new encryption key;

receiving a key update request for said new encryption key, said key update request comprising an identifier for a requester;

determining that said identifier agrees with said authorisation information associated with the requested user data; and sending said new encryption key.

* * * * *